April 13, 1965         J. L. GROEBE         3,178,373
ACTIVATION PROCEDURE FOR HYDROGENATION CATALYSTS
Filed July 31, 1961
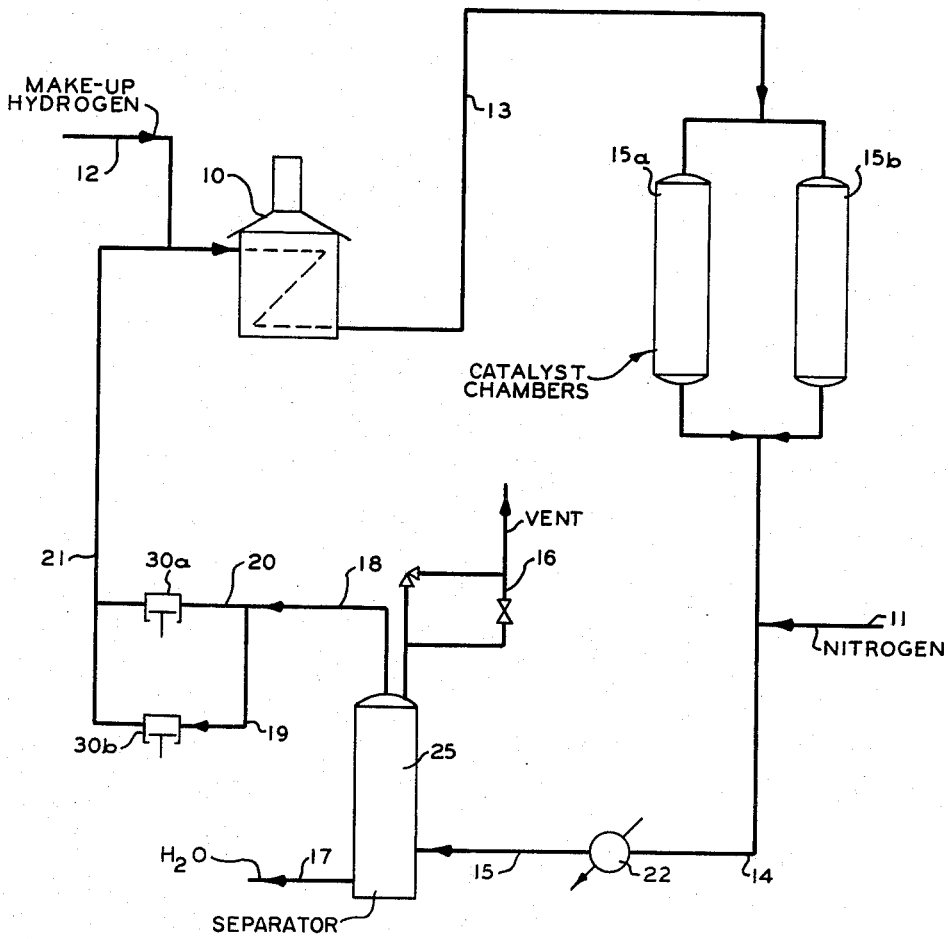
INVENTOR.
J. L. GROEBE
BY *Hudson & Young*
ATTORNEYS

United States Patent Office 3,178,373
Patented Apr. 13, 1965

3,178,373
**ACTIVATION PROCEDURE FOR HYDRO-
GENATION CATALYSTS**
John L. Groebe, Bartlesville, Okla., assignor to Phillips
Petroleum Company, a corporation of Delaware
Filed July 31, 1961, Ser. No. 128,040
4 Claims. (Cl. 252—459)

This invention relates to the activation of metal hydrogenation catalysts. In accordance with one aspect, this invention relates to an improved method for activating or reducing metal hydrogenation catalysts, especially nickel-kieselguhr hydrogenation catalysts. In accordance with another aspect, this invention relates to the metal hydrogenation catalysts activated by the above process and to the hydrogenation of hydrocarbons, especially aromatic hydrocarbons, in contact with said catalysts.

In the hydrogenation of unsaturated compounds, and particularly in the hydrogenation of aromatic hydrocarbons, such as benzene, metal catalysts are used. These metal catalysts are usually received from the manufacturer as metal oxide or other compound on a support such as kieselguhr. The metal oxide or other compound must be reduced, at least in part, to the metal before it is active for hydrogenation. Normally, this reduction step is accomplished with the catalyst in place in the hydrogenation reactor, but before the reactor is placed onstream for hydrogenation. This reduction step has been ordinarily carried out in the prior art by employing pure hydrogen as a reducing medium. However, pure hydrogen is extremely expensive to use. Also, in some plant practices, steam is added to a hydrogen-containing reducing stream as a diluent to control the temperature rise during reduction of the catalyst. However, this has also been found to be undesirable since the catalyst life is somewhat less when employing steam as a diluent compared with a catalyst reduced with commercial pure cylinder hydrogen.

According to the invention, I have found that metal hydrogenation catalysts, particularly nickel hydrogenation catalyst, can be effectively and efficiently activated or reduced prior to use in the absence of added steam without the prior art disadvantages by a two-step process comprising contacting the catalyst first with an inert gas and then with a hydrogen-containing stream.

Accordingly, one object of this invention is to provide an improved method for activating hydrogenation catalysts.

Another object of this invention is to provide an improved method for activating or reducing nickel-kieselguhr hydrogenation catalysts.

Another object of this invention is to provide active metal hydrogenation catalysts, especially nickel hydrogenation catalysts, of increased catalyst life.

Other objects, aspects as well as the several advantages of this invention will be apparent to those skilled in the art upon studying this disclosure, the drawing and the appended claims.

Broadly, according to the invention, I provide an improved process for activating or reducing metal hydrogenation catalysts, such as nickel-kieselguhr hydrogenation catalysts, which comprises the steps of first heating the catalyst with an inert gas until the catalyst has reached a temperature of at least about 500° F. and is substantially dehydrated, and then contacting the catalyst with a hydrogen-containing stream at a temperature not exceeding about 750° F. until the desired degree of reduction of the catalyst is achieved. I have found that catalyst activation can be carried out in the absence of added steam and that catalysts of increased catalyst life can be obtained when activated according to the invention.

According to a specific embodiment of the invention, I provide an improved process for activating a bed of fresh nickel-kieselguhr hydrogenation catalyst in the absence of added steam which comprises the steps of flushing the system with an inert gas, pressuring the system with an inert gas, such as nitrogen, and cycling heated nitrogen through the catalyst bed until the bed is substantially free of water and the bed effluent is above a temperature of about 500° F., bleeding said inert gas from the system and replacing same with a hydrogen-containing stream, preferably an impure hydrogen stream containing demethylizable hydrocarbon impurities, so as to increase the rate of heating of said bed due to the demethylation reaction until a reduction temperature ranging from about 650 to about 750° F. is reached, and continuing the cycling of said hydrogen stream through said bed until the desired degree of reduction is achieved.

The inert gas I prefer to use for flushing the system and first heating the catalyst is nitrogen. However, other inert gases such as methane, $CO_2$, etc. or mixtures thereof, can be used when desired. The inert gas is usually cycled or circulated over the catalyst bed at a temperature of at least 500° F. and can be at a temperature up to about 800° F. It will be understood by those skilled in the art that higher temperatures will require less heating time for bringing the catalyst bed up to the desired temperature. The inert gas is heated to an elevated temperature and circulated through the bed until the bed is substantially dehydrated and the effluent is above a temperature of about 500° F. At this point the catalyst is substantially dehydrated an can then be contacted with a hydrogen-containing stream to reduce and activate the catalyst.

Following the heating and dehydration treatment with the inert gas described above the catalyst is then contacted with a hydrogen-containing stream. Although a pure hydrogen stream can be employed I prefer to utilize as the reducing medium or atmosphere an impure hydrogen stream containing a minor proportion of at least one hydrocarbon material demethylizable at a temperature above about 500° F. The impure hydrogen streams that can be used are ordinarily obtained as hydrogen-rich residue gas streams recovered from hydrocarbon conversion processes. Ordinarily, such hydrogen-rich streams contain a limited amount of at least one demethylizable hydrocarbon such as acyclic hydrocarbons having from 2 to about 6 carbon atoms. Any impure hydrogen stream containing demethylizable hydrocarbon materials that are demethylizable at temperatures ranging from about 500 to about 750° F. can be employed according to the invention. Furthermore, an impure hydrogen that has been formerly utilized for the reduction of the catalyst can also be employed. Such a hydrogen source will ordinarily comprise hydrogen and methane.

The impure hydrogen streams that I utilize as the reducing medium will contain up to about 12 mole percent demethylizable hydrocarbons, normally from about 4 to about 8 mole percent. When the demethylizable components are present in the hydrogen source above about 2 mole percent recycle is required during activation. This can be accomplished by recycling a portion of the reactor effluent (hydrogen and methane) and bleeding off the remaining portion to allow fresh hydrogen to be run into the system. This then allows control of concentration of demethylizable material in the reactor charge (or hydrogen concentration) and bed heating rates. When the demethylizable impurities are below about 2 mole percent, in some instances, it is not necessary to dilute the reactivation process by recycle of the methane-hydrogen produced during the activation step.

In actual operation, when an impure hydrogen stream containing demethylizable hydrocarbon material(s) contacts the metal hydrogenation catalyst to be reduced at temperatures above about 500° F., rapid demethylation of the $C_2$ and heavier hydrocarbons in the hydrogen stream occurs. The demethylation reaction is highly exothermic. Thus, according to the invention, the heat of demethylation of the hydrocarbons present in the hydrogen stream is used along with the heat in the circulating inert gas (nitrogen) stream to bring the catalyst bed to the desired reduction temperature. In some instances, the quantity of demethylizable material employed in the hydrogen stream can be regulated so as to control the rate of heating of the catalyst bed. However, ordinarily this is accomplished by controlling the amount of make-up hydrogen containing stream introduced into the system.

Catalysts that can be activated or reduced according to the two-step procedure of the invention include any of the well known metal hydrogenation catalysts, either supported or unsupported. However, nickel-kieselguhr catalysts are preferred since they are quite active for the hydrogenation of aromatic hydrocarbons, especially benzene. Other active hydrogenation catalysts that can be reduced according to the invention include Raney-nickel, copper chromite, finely divided platinum, finely divided palladium, chromium oxide, and the like.

The catalysts that can be activated according to the invention are well known and methods for their preparation are also well known. The nickel-kieselguhr catalysts, which are preferred for the hydrogenation of benzene, can be prepared by saturating kieselguhr with a reducible metal compound, such as nickel hydroxide, after which at least a portion of the nickel compound in the mixture is reduced to elemental nickel by contacting same with an inert gas and a hydrogen-containing stream according to the invention. As indicated above, the activation temperature ranges from about 500 to about 750° F. or higher for these catalysts. The nickel-kieselguhr catalysts activated as hereinbefore described are in a state of high activity because such treatment reduces at least a part of the nickel compound to elemental nickel, generally 40 to 60 percent of the nickel being reduced. The metal hydrogenation catalysts activated according to the invention can be on other supports such as silica gel, alumina, and other known hydrogenation catalyst supports.

As indicated above, the metal hydrogenation catalysts, and particularly nickel-kieselguhr catalysts, are effective for the hydrogenation of aromatic hydrocarbons to saturated hydrocarbons, particularly the conversion of benzene to cyclohexane. Ordinarily the hydrogenation reaction is carred out at a temperature in the range 200 to 600° F. and a pressure ranging from 300 to 600 p.s.i.g. As another feature of this invention, the impure hydrogen stream employed for activation of the catalyst can also be utilized as the hydrogen stream during hydrogenation of the aromatic hydrocarbon or other material subsequently hydrogenated with the activated catalyst.

Referring now in detail to the drawing, the system shown essentially comprises a furnace 10, catalyst chambers 15a and 15b containing a bed of a metal catalyst to be reduced, preferably a nickel-kieselguhr catalyst, a cooler 22, a separator 25 and compressors 30a and 30b.

According to the invention, an inert gas such as nitrogen is first utilized to flush the system of undersirable materials and then to bring the catalyst beds in the catalyst chambers up to the desired reduction temperature. In actual operation, the system is first evacuated, nitrogen is then introduced by way of line 11 into the system and then the system evacuated one or more times. After the system is freed of undersirable materials, the whole system is pressured with nitrogen introduced by way of line 11. The nitrogen is cycled through cooler 22, separator 25, compressors 30a and b and passed through furnace 10 wherein it is heated to a temperature of at least 500° F. and generally a temperature of the order of about 700 to 750° F. The heated nitrogen effluent from the furnace is cycled through the catalyst chambers 15a and b, cooler 22, separator 25, compressors 30a and b, furnace 10, and then back through the catalyst chambers until the outlet temperature of the catalyst chambers reaches a level above the water dew point of the system and the temperature of the beds of catalyst have reached a temperature of at least 500° F. During the time the catalyst is heated to a reduction temperature of at least 500° F., water of hydration of the catalyst is condensed in cooler 22 and removed from the system in separator 25 by way of conduit 17. The amount of this water can be measured to determine when the catalyst has been substantially completely dehydrated.

When the catalyst bed has reached a temperature of at least 500° F., and the bed is substantially dehydrated, the inert gas, preferably nitrogen, is gradually bled from the system through vent 16 and a make-up hydrogen-containing stream is introduced into the system by way of line 12 to replace the inert gas being removed. The make-up hydrogen stream together with circulating nitrogen is passed through furnace 10 wherein it is heated, conduit 13 and then passed through catalyst chambers 15a and 15b. The make-up hydrogen stream preferably contains demethylizable materials that are demethylizable at a temperature in the range 500 to 750° F. The demethylizable hydrocarbons on contacting the heated catalyst demethylate and thus increase the rate of heating of the catalyst bed due to the demthylation reaction (which is exothermic) until a reduction temperature in the range 650 to about 750° F. is reached.

The reduction effluent removed from the catalyst chambers is comprised principally of hydrogen, methane, and decreasing amounts of nitrogen as the cycling continues. The effluent is passed by way of conduit 14 through cooler 22, line 15 and then to separator 25. The temperature of the reduction gas is reduced to a temperature of about 100° F. in cooler 22. Condensed water is removed from the lower portion of separator 25 by way of conduit 17 and bleed gas, principally nitrogen (but also some hydrogen and methane), is removed overhead from separator 25 by way of vent 16. A gas stream for recycle comprising hydrogen and methane is removed from separator 25 by line 18, introduced into compressors 30a and 30b by way of lines 20 and 19, respectively, and then passed by way of line 21 to furnace 10 and then to the catalyst chambers as previously described.

If one encounters difficulties in excessive temperature increases in the catalyst chambers due to the demethylizable hydrocarbons in the make-up hydrogen, the addition of hydrogen make-up can be reduced and the reduction gas can be circulated through the system until the temperature is again under control. Also, if desired, when first introducing make-up hydrogen, a pure hydrogen stream can be utilized to initiate reduction. After the catalyst beds have been brought up to the desired reduction temperature (at least 500° F.) and as reduction proceeds, a controlled amount of hydrocarbon impurities, for example demethylizable materials such as $C_2$ to $C_6$ acyclic hydrocarbons, are introduced into the system to increase the reduction temperature. Thus, the quantity of demethylizable hydrocarbons used can be controlled to control the rate of heating of the catalyst beds. Further, if desired, a hydrogen-containing stream previously utilized for reducing the catalyst can be used as the make-up hydrogen stream. Such a stream would be comprised principally of hydrogen and methane (an inert diluent) with a very small amount of demethylizable materials. The recycle hydrogen reduction system of the invention eliminates the need for steam in the reduction process. This allows a higher percentage of the catalyst to be reduced, thereby lenthening catalyst life.

After the catalyst has been activated, according to the procedure of the invention as described above, the catalyst is now available for utilization for hydrogenation, for example the hydrogenation of aromatic hydrocarbons. The hydrogenation process for which these catalysts can be used is well known to those skilled in the art and need not be discussed further here.

A more comprehensive understanding of the invention can be obtained by referring to the following illustrative example which is not intended, however, to be unduly limitative of the invention.

SPECIFIC EXAMPLE

Nitrogen and an impure hydrogen stream containing demethylizable hydrocarbons was utilized without steam diluent to activate a fixed bed of fresh nickel-kieselguhr catalysts according to the process flow shown in the drawing. The impure hydrogen stream utilized as make-up hydrogen comprised 96 mole percent hydrogen, 1 mole percent methane, 1 mole percent propane, ½ mole percent isobutane, and the remainder $C_5$ hydrocarbons.

After the system had been evacuated for removal of undesirable materials the system was pressured with nitrogen at 180 p.s.i.g. Circulation of the nitrogen in the system was begun and the heater fired so as to heat the recirculating nitrogen to a temperature of about 750° F. and this stream was circulated through the catalyst bed until the bed had reached a temperature of 500° F.

After the catalyst had been dehydrated and heated to a temperature of 500° F. nitrogen was slowly bled from the system and the above described make-up hydrogen stream was introduced into the system. The activation temperature in chamber 15a or 15b (one in service—the other being activated) was maintained between a temperature of about 650 to about 725° F. for approximately 60 hours. Approximately 56 percent of the nickel was reduced. The composition of the effluent from the catalyst chambers after hydrogen make-up introduction over a 58-hour period is shown in Table I below.

Table I

| Hours After Start-up | $H_2$ (Mole percent) | Co and $N_2$ (Mole percent) | $CO_2$ (Mole percent) | Methane (Mole percent) |
|---|---|---|---|---|
| 0 | 0.23 | 86.2 | 13.2 | |
| 6 | 2.30 | 86.22 | 13.18 | |
| 7 | 3.07 | 84.66 | 12.14 | |
| 8 | 1.59 | 75.09 | 10.31 | 9.71 |
| 9 | 13.85 | 57.01 | 4.28 | 35.23 |
| 11 | 41.56 | 40.41 | 1.87 | 55.61 |
| 12 | 60.35 | 9.72 | 0.32 | 48.39 |
| 14 | 80.10 | 0.82 | 0.07 | 24.71 |
| 16 | 84.89 | 0.05 | 0.05 | 19.60 |
| 18 | 85.53 | 0.00 | 0.00 | 14.76 |
| 21 | 84.72 | 0.00 | 0.00 | 14.06 |
| 23 | 84.21 | 0.00 | 0.00 | 13.71 |
| 25 | 84.80 | 0.00 | 0.00 | 14.39 |
| 31 | 86.67 | 0.00 | 0.00 | 13.17 |
| 40 | 84.16 | 0.00 | 0.00 | 15.61 |
| 58 | 82.43 | 0.00 | 0.00 | 17.53 |

The catalyst activated according to the invention was found to have a catalyst life for the hydrogenation of benzene seven times that for a similar nickel-kieselguhr catalyst activated with hydrogen and added steam. The catalyst was quite active since runaway temperatures were experienced upon starting up the benzene hydrogenation operation.

It will be evident to those skilled in the art that many variations and modifications can be practiced upon a consideration of the foregoing disclosure. Such variations and modifications are believed to be within the spirit and scope of the present invention.

I claim:
1. A process for the activation of an unreduced nickel-kieselguhr catalyst wherein the nickel is in the form of a reducible compound in the absence of added steam which comprises the steps of cycling a heated inert gas stream through a fixed bed of said unreduced catalyst until the bed effluent temperature is above the water dew point of the system and the effluent is above a demethylation temperature of about 500° F., gradually bleeding inert gas from said stream and introducing hydrogen containing a minor proportion of at least one demethylizable hydrocarbon material having up to and including six carbon atoms into said stream to reduce said catalyst and continuing said introduction until substantially all of said inert gas is replaced, cycling said stream through said bed so as to increase the rate of heating of said bed due to the demethylation reaction until a reduction temperature in the range of 650 to about 750° F. is reached, and continuing the cycling until the desired degree of reduction of said unreduced metal to elemental metal is achieved.

2. A process according to claim 1 wherein said inert gas is nitrogen.

3. In a process for the activation of an unreduced metal hydrogenation catalyst wherein the metal in the form of a reducible compound is reduced at an elevated temperature by contacting with a hydrogen-containing process stream in a cyclic system comprising a reaction zone containing a fixed bed of unreduced catalyst, a heat exchange zone for cooling the effluent from the reaction zone, a fluid separation zone for separating condensed liquids, a compression zone, and a heating zone, the improvement for effecting said activation which comprises the steps of flushing the system with nitrogen, pressuring said system with nitrogen, heating said nitrogen to a temperature of at least 500° F. and circulating said heated nitrogen through said system until said unreduced catalyst bed has reached a temperature of at least 500° F. and said bed is substantially free of moisture, slowly bleeding nitrogen from the stream circulating through said system and replacing same with a hydrogen stream containing up to 12 volume percent of demethylizable hydrocarbon impurities having up to and including six carbon atoms demehylizable at a temperature above about 500° F. to reduce said catalyst, and continuing said circulation until said bed has reached a reduction temperature in the range 650° to 750° F. and the desired degree of reduction of said unreduced metal catalyst to elemental metal is achieved.

4. A process according to claim 3 wherein said catalyst is an unreduced nickel-kieselguhr hydrogenation catalyst.

References Cited by the Examiner

UNITED STATES PATENTS

| | | | |
|---|---|---|---|
| 2,040,233 | 5/36 | Adkins | 252—459 |
| 2,244,573 | 6/41 | Roberts | 252—459 |
| 2,254,748 | 9/41 | Michael et al. | 252—472 X |
| 2,273,297 | 2/42 | Szayna | 252—459 X |
| 2,373,501 | 4/45 | Peterson | 260—667 |
| 2,440,414 | 4/48 | Oblad | 260—667 |
| 2,565,347 | 8/51 | Bremner et al. | 252—459 X |
| 2,696,475 | 12/54 | Farrow | 252—466 X |
| 3,098,829 | 7/63 | White et al. | 252—466 |

MAURICE A. BRINDISI, *Primary Examiner.*

JULIUS GREENWALD, *Examiner.*